(12) United States Patent
Turner et al.

(10) Patent No.: US 7,748,736 B2
(45) Date of Patent: Jul. 6, 2010

(54) RETRACTABLE SUPPLEMENTAL INFLATABLE RESTRAINT SYSTEM FOR VEHICLE HEAD REST

(75) Inventors: Phillip M. Turner, Montrose, MI (US); Kon-Mei Ewing, Rochester, MI (US); Yueh-Se J. Huang, Ann Arbor, MI (US); Pei-Chung Wang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 163 days.

(21) Appl. No.: 12/051,359

(22) Filed: Mar. 19, 2008

(65) Prior Publication Data

US 2009/0236834 A1 Sep. 24, 2009

(51) Int. Cl.
*B60R 21/18* (2006.01)
(52) U.S. Cl. ........................................ 280/733; 280/807
(58) Field of Classification Search ................. 280/733, 280/730.1, 736, 806, 807, 801.1
See application file for complete search history.

(56) References Cited

U.S. PATENT DOCUMENTS

| | | | |
|---|---|---|---|
| 3,869,145 A * | 3/1975 | Takada | 280/733 |
| 3,953,049 A * | 4/1976 | Surace et al. | 280/730.1 |
| 5,282,648 A | 2/1994 | Peterson | |
| 6,237,945 B1 * | 5/2001 | Aboud et al. | 280/733 |
| 6,585,289 B1 * | 7/2003 | Hammer et al. | 280/733 |
| 6,705,641 B2 * | 3/2004 | Schneider et al. | 280/733 |
| 6,729,643 B1 | 5/2004 | Bassick et al. | |
| 7,150,468 B2 * | 12/2006 | Pan | 280/730.1 |
| 7,513,524 B2 * | 4/2009 | Oota et al. | 280/733 |
| 2004/0075252 A1 * | 4/2004 | Pan | 280/730.1 |

FOREIGN PATENT DOCUMENTS

DE 4116162 A1 * 11/1992

* cited by examiner

*Primary Examiner*—Faye M. Fleming
(74) *Attorney, Agent, or Firm*—Quinn Law Group, PLLC

(57) ABSTRACT

An enhanced head-and-neck restraint system is provided for use with a vehicle having a passenger compartment with a seat assembly and a safety belt assembly mounted therein. The restraint system includes first and second collar straps each having an inflatable cushion integrated thereto. A first end of each collar strap is attached to a headrest portion of the seat assembly to transition between a retracted position, in which the collar straps are substantially inside the headrest portion, and a use position, in which each collar strap attaches to a belt webbing of the safety belt system. A fluid dispensing apparatus is in fluid communication with the inflatable cushions, and operable to selectively transition the inflatable cushions from a non-expanded state to an expanded state when the collar straps are in the use position.

20 Claims, 2 Drawing Sheets

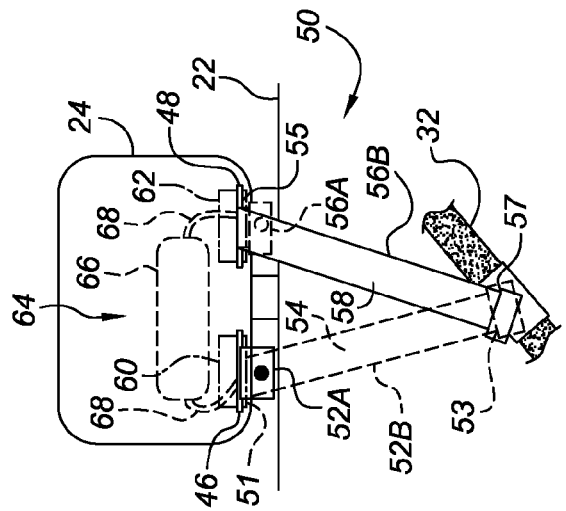
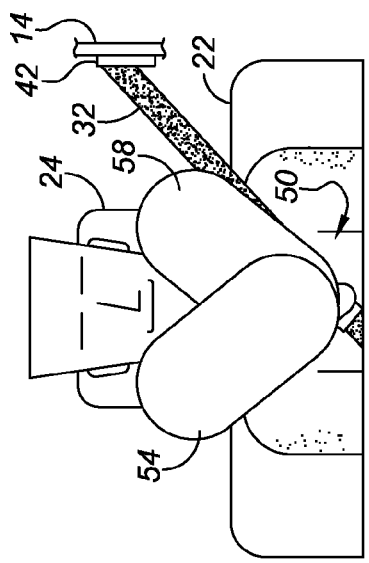
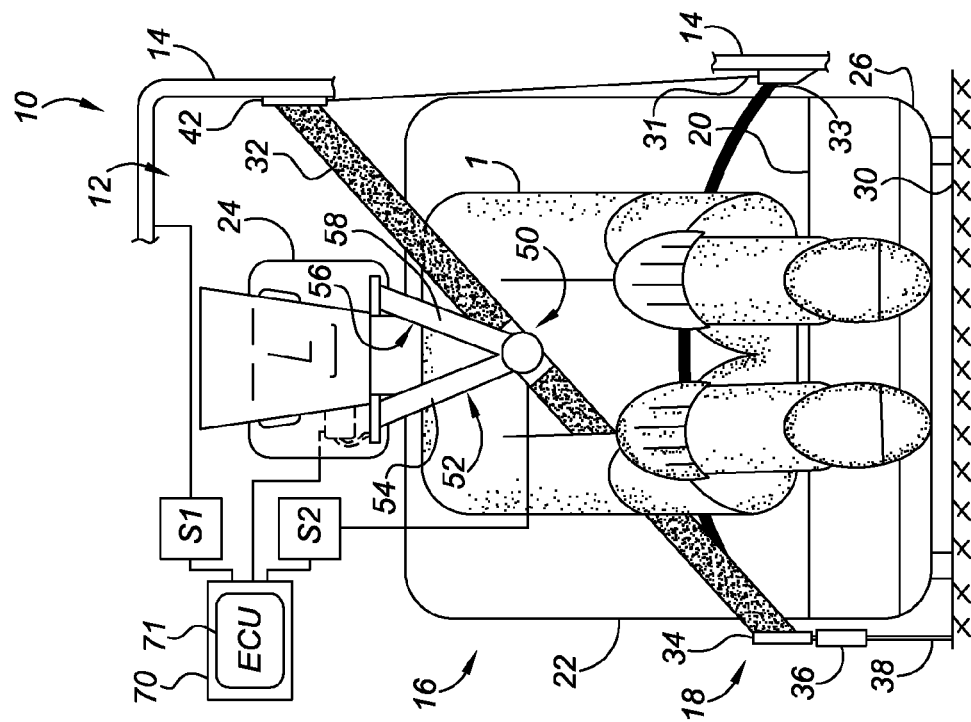
FIG. 1A

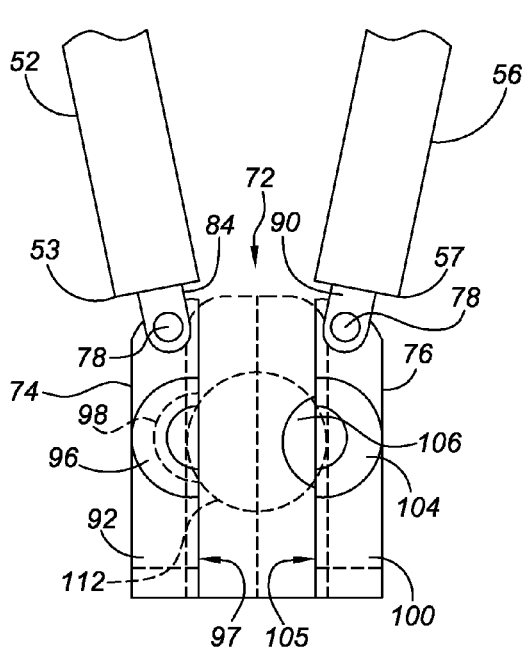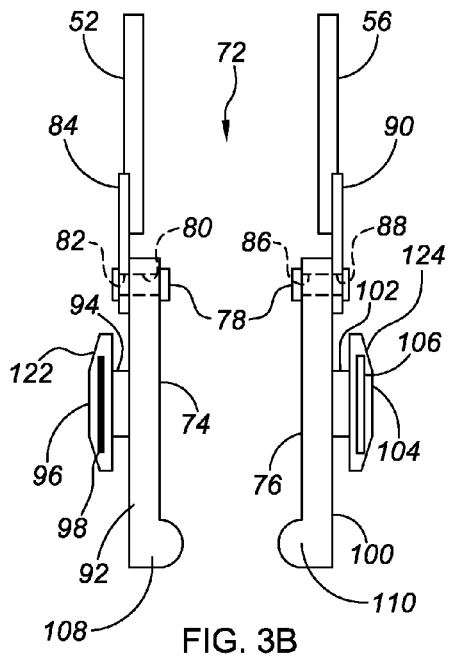
FIG. 3A
FIG. 3B
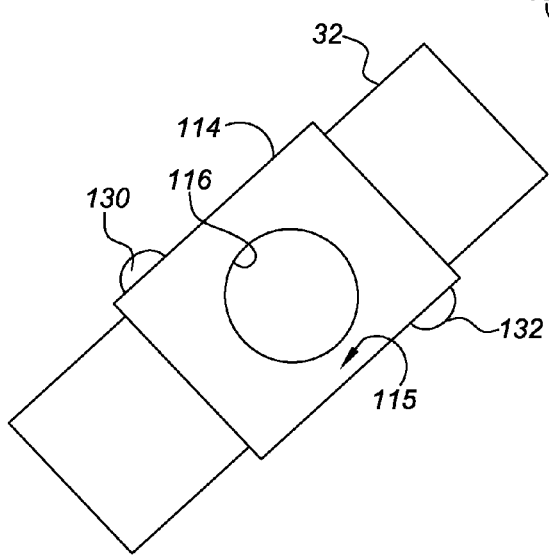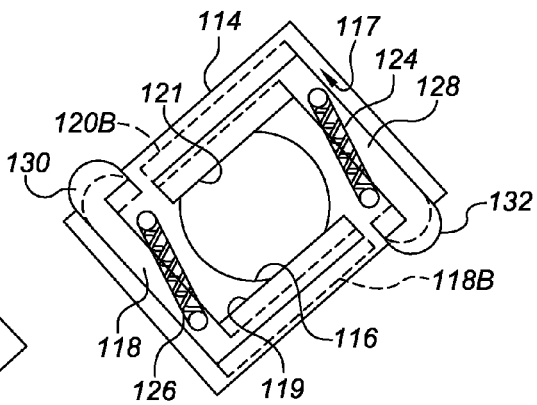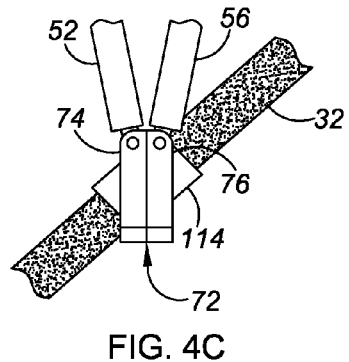
FIG. 4A
FIG. 4B
FIG. 4C

RETRACTABLE SUPPLEMENTAL INFLATABLE RESTRAINT SYSTEM FOR VEHICLE HEAD REST

TECHNICAL FIELD

The present invention relates generally to inflatable restraint systems for use in motorized vehicles, and more particularly to enhanced head and neck restraint systems deployable from a vehicle seat assembly.

BACKGROUND OF THE INVENTION

A seat belt assembly is a type of harness system designed to restrain an occupant of an automobile or other motorized vehicle against inadvertent movement that may result, for example, from an abrupt stop or sudden impact. Conventional seat belt assemblies, more commonly referred to as a safety belt, employ a belt buckle or like element, which is positioned inboard from the occupant seating position, for engagement with a mating latch plate or fastener, generally provided outboard from the occupant seating position. Engagement of the belt buckle with the latch plate provides a belt or belt webbing across the body of a seated occupant for restraining the occupant against abrupt movement from the seat.

Many vehicles, as part of an overall occupant restraint system, may also include one or more inflatable airbag devices. Inflatable airbag devices, which are now more normally referred to in the art as Supplementary Restraint Systems (SRS), Air Cushion Restraint Systems (ACRS), or Supplemental Inflatable Restraint Systems (SIR), are originally equipped in almost all present day automotive vehicles. Airbag devices are generally located in the passenger compartment of automotive vehicles, and act as a selectively deployable cushion capable of attenuating occupant kinetic energy.

Traditional airbag devices comprise an inflatable airbag module stored either behind the vehicle instrument panel (e.g., for passenger-side airbags), or mounted to the steering wheel hub (e.g., for driver-side airbags). A plurality of sensors or similar devices is strategically located to detect the onset of a predetermined event. The sensor(s) responsively activates an inflation device, internally located in the airbag module, to produce a flow of inflating gas into an inflatable flexible cushion (i.e., an airbag cushion), also located within the airbag module. This causes the airbag cushion to be deployed in a rearward direction within the vehicle passenger compartment.

SUMMARY OF THE INVENTION

The present invention provides a retractable supplemental inflatable restraint (SIR) system for a motorized vehicle having a passenger compartment with a seat assembly and a safety belt assembly mounted therein. The seat assembly includes a headrest portion at an upper end thereof, vertically proximate to a seat back portion. The safety belt assembly includes a belt webbing, preferably having a three-point attachment configuration. The SIR includes a first collar strap with a first inflatable cushion integrated thereto, and a second collar strap with a second inflatable cushion integrated thereto. A first end of each collar strap is configured to operatively attach to the headrest portion to transition between a retracted position, in which the collar straps are stowed substantially inside the headrest portion, and a use position, in which a second end of each collar strap attaches to the belt webbing. A fluid dispensing apparatus is in fluid communication with the first and second inflatable cushions, and operable to selectively simultaneously transition the inflatable cushions from a non-expanded state to an expanded state when the first and second collar straps are in the use position.

According to one aspect of the first embodiment, the SIR system also includes a controller in operative communication with the fluid dispensing device to regulate the selective transition of the first and second inflatable cushions from the non-expanded state to the expanded state. A collar sensor is in communication with the controller, and is configured to monitor whether the first and second collar straps are in the use position and transmit signals indicative thereof to the controller. The controller is programmed and configured to disable the fluid dispensing device in response to collar sensor signals indicating that the first and second collar straps are not in the use position. In this instance, it is also preferred that the SIR system include a trigger sensor that is in communication with the controller, and is configured to monitor whether any of a variety of predetermined activation events has occurred and to transmit signals indicative thereof to the controller. To this regard, the controller is further programmed and configured to activate the fluid dispensing device if trigger sensor signals indicate one of the predetermined activation events has occurred and collar sensor signals indicate the first and second collar straps are in the use position.

According to another aspect of the first embodiment, the second end of the first collar strap and the second end of the second collar strap are attached to the belt webbing by a clasping mechanism. Ideally, the clasping mechanism includes a first clasp member attached to the second end of the first collar strap, and a second clasp member attached to the second end of the second collar strap. The first clasp member is configured to mate with the second clasp member to thereby releasably lock to the belt webbing. The clasping mechanism preferably also includes a receiving plate that is attached to the belt webbing and configured to mate with and attach to the first and second clasp members. The receiving plate is preferably slidably repositionable along the belt webbing.

Ideally, the first clasp member includes a body with a base protruding therefrom. A first button-head portion with a cavity defined therein is integrated with the base. Similarly, the second clasp member includes a body with a base protruding therefrom. A second button-head portion with an alignment tab extending therefrom is integrated with the base. The cavity is configured to receive and mate with the alignment tab such that the first button-head portion aligns with the second button-head portion to form a button head clasping pin. In this instance, the receiving plate preferably has a receiving slot configured to receive the button head clasping pin. Moreover, the receiving plate preferably includes a latching mechanism configured to selectively releasably lock the button head clasping pin to the receiving plate and thereby retain the first and second collar straps in the use position.

In accordance with another aspect of the first embodiment, the first end of the first collar strap is attached to the headrest portion by a first retractor. Similarly, the first end of the second collar strap is attached to the headrest portion by a second retractor. The first and second retractors are respectively configured to selectively bias the first and second collar straps into the retracted positions.

In accordance with yet another aspect of the first embodiment, the fluid dispensing apparatus includes a gas emitting inflator configured to emit inflation gas. One or more fill tubes place the inflator in fluid communication with the first and second inflatable cushions to port inflation gas from the inflator to the cushions.

The present invention also provides a motorized vehicle, which includes a seat assembly, a safety belt webbing, first and second collar straps, and one or more fluid dispensing apparatuses. The seat assembly is mounted to the vehicle structure, and has a seat back portion with a headrest portion integrated at an upper end thereof. The belt webbing is attached to the vehicle structure, the seat assembly, or both, preferably in a three-point attachment configuration.

The first collar strap has a first inflatable cushion integrated thereto, whereas the second collar strap has a second inflatable cushion integrated thereto. A first end of the first collar strap is attached to a first section of the headrest portion to transition between a first retracted position, in which the first collar strap is substantially inside the headrest portion, and a first use position, in which a second end of the first collar strap is attached to the belt webbing. A first end of the second collar strap is attached to a second section of the headrest portion, which is spaced from the first section, to transition between a second retracted position, in which the second collar strap is stowed substantially inside the headrest portion, and a second use position, in which a second end of the second collar strap is attached to the belt webbing. At least one fluid dispensing apparatus is in fluid communication with the first and second inflatable cushions. The fluid dispensing apparatus is operable to selectively simultaneously transition the first and second inflatable cushions from a non-expanded state to an expanded state when the first and second collar straps are in respective use positions.

According to one aspect of this embodiment, the second end of the first collar strap and the second end of the second collar strap are attached to the belt webbing by a clasping mechanism. The clasping mechanism includes a first clasp member attached to the second end of the first collar strap, and a second clasp member attached to the second end of the second collar strap. A receiving plate is slidably attached to the belt webbing and configured to mate with and attach to the first and second clasp members.

Ideally, the first clasp member includes a body with a base protruding therefrom. A first button-head portion with a cavity defined therein is integrated with the base, in spaced relation to the body. Similarly, the second clasp member includes a body with a base protruding therefrom. A second button-head portion with an alignment tab extending radially outward therefrom is integrated with the base, in spaced relation to the body. The cavity is configured to receive and mate with the alignment tab such that the first button-head portion aligns with the second button-head portion to form a button head clasping pin. The receiving plate preferably has a receiving slot configured to receive the button head clasping pin. In addition, the receiving plate preferably includes a latching mechanism configured to selectively releasably lock the button head clasping pin to the receiving plate and thereby retain the first and second collar straps in the use position.

The above features and advantages, and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

FIG. 1A is a schematic front-view illustration of a vehicle passenger compartment having an exemplary seat assembly with a retractable supplemental inflatable restraint system according to a preferred embodiment of the present invention integrated thereto;

FIG. 1B is a schematic front-view illustration of the seat assembly of FIG. 1 depicting the retractable supplemental inflatable restraint system in an expanded state;

FIG. 2 is a schematic front-view illustration of the seat assembly of FIG. 1 depicting first and second retractable collar straps transitioning between respective stowed and use positions;

FIG. 3A is a schematic underside-view illustration of the first and second collar straps of FIG. 1 each having a respective member of a clasping mechanism in accordance with one embodiment of the present invention attached at one end thereof;

FIG. 3B is a schematic side-view illustration of the first and second collar straps and the clasping mechanism of FIG. 3A;

FIG. 4A is a schematic top-view illustration of a portion of the safety belt assembly of FIG. 1 with a clasp receiving plate slidably disposed on a belt webbing;

FIG. 4B is a schematic underside-view illustration of the receiving plate of FIG. 4A depicting a latching mechanism in accordance with one embodiment of the present invention; and FIG. 4C is a schematic top-view illustration of the clasping mechanism of FIGS. 3A and 3B mating with and secured to the receiving plate of FIGS. 4A and 4B.

DESCRIPTION OF THE PREFERRED EMBODIMENTS

Referring to the drawings, wherein like reference numbers refer to like components throughout the several views, shown generally at 10 in FIG. 1A is an exemplary motor vehicle for using the retractable supplemental inflatable restraint (SIR) systems of the present invention. FIG. 1A is provided merely for explanatory purposes, the dimensions and relative orientation of the constituent components being intentionally exaggerated for clarity and for a better understanding of the present invention. As such, the present invention is by no means limited to the particular structure or layout presented therein. For example, the present invention can be incorporated into any vehicle platform, such as, but not limited to, coupe- or sedan-type passenger cars, light trucks, heavy duty vehicles, sport utility vehicles, vans, buses, trains, boats, airplanes, etc.

The vehicle 10 includes a number of interior compartments, represented collectively herein by passenger compartment 12, which is defined, at least in part, by vehicle structure 14 (which may be any of an A-, B- or, C-pillar, roof panel, door assembly, seat assembly, etc.) A seat assembly, indicated generally at 16, and safety belt assembly, indicated generally at 18, are both mounted inside the passenger compartment 12.

The seat assembly 16 includes a seat bottom portion 20 and a seat back portion 22 with a headrest portion 24 integrated to an upper end thereof. Notably, the headrest portion 24 may be manufactured as a separate component from the seat back portion 24 and subsequently attached thereto (as shown in FIGS. 1A and 1B), or may consist of the upper most extent of a seat back that is intentionally designed to provide a headrest function. The seat assembly 16 is fabricated with a seat frame 26, which is mounted in a conventional manner to a vehicle floor pan 30. The seat frame 26 may be mounted for adjusting movement by a mechanical or electro-mechanical seat adjuster (not shown) which may be of the type which moves the seat assembly 16 fore and aft, or may be a six-way seat adjuster that allows an occupant 1 to selectively tilt the seat bottom 20 in a forward or rear pitch, adjust the seat assembly 16 vertically upwards or downwards, and move the seat assembly 16 fore and aft.

The seat belt assembly 18 includes a length of retractable seat belt webbing 32, a latch plate 34, and a belt buckle 36. FIG. 1A shows the belt webbing 36 in a preferred arrangement, mounted in a three-point attachment configuration. Specifically, a first end 31 of the belt webbing 32 is attached to the vehicle structure 14 (e.g., a B-pillar) proximate to the floor pan 30 via a belt retractor 40. The belt webbing 32 then extends upwards along the center or B-pillar, which is equipped with a D-ring 42 or like element, to support the belt webbing 32 at a position near the vehicle roof, laterally outboard of the seat assembly 16. Preferably, the D-ring 42 is selectively vertically repositionable along the B-pillar by an adjusting mechanism (not shown) of known design. The belt webbing 32 is secured, in a known manner, at a second 33 end thereof to the vehicle structure 14 adjacent the first end 31. It is also considered within the scope of the present invention that the first end 31 and/or second end 33 of the belt webbing 32 be attached to the seat assembly 16 (for example, to the seat frame 26).

The belt buckle 36 is preferably coupled by a buckle strap 38 or comparable element to the vehicle floor pan 30 (as shown in FIG. 1A) or the frame 26 of the seat assembly 16 on the opposite side of the seat assembly 16 from the belt webbing 32. For example, as shown in FIG. 1A, the belt buckle 36 is positioned laterally inboard of the seat assembly 16, opposite of the points of attachment of the first and second ends 31, 33 of the belt webbing 32. The latch plate 34 is preferably supported by the belt webbing 32, and adapted to slide between the first and second ends 31, 33 of the belt webbing 32. It should be understood that the relative orientation of the belt webbing 32 and belt buckle 36, as well as their respective points of attachment, may be infinitely varied from that which is shown in FIG. 1A so long as engagement or mating of the latch plate 34 with the buckle 36 disposes at least a portion of the belt webbing 32 across an occupant 1 seated in the seat assembly 16.

In accordance with this invention, the vehicle 10 includes at least one retractable supplemental inflatable restraint system, referred to hereinafter as "SIR" and indicated generally at 50 throughout the drawings. The SIR 50 includes a first collar strap 52 with a first inflatable or flexible cushion 54 integrated thereto, and a second collar strap 56 with a second inflatable or flexible cushion 58 integrated thereto. The first and second inflatable cushions 54, 58 may be manufactured as separate components from the first and second collar straps 52, 56, and thereafter attached (e.g., via sticking, mechanical fastening, or otherwise), but preferably consist of a single-piece, unitary structure (as seen throughout the several drawings). According to a preferred embodiment of the present invention, a first end (shown hidden in FIG. 2 at 51) of the first collar strap 52 is attached to a first section 46 of the headrest portion 24 to transition between a first retracted or stored position 52A, in which the first collar strap 52 is stowed substantially inside the headrest portion 24, and a first use or active position (shown hidden in FIG. 2 at 52B), in which a second end (shown hidden in FIG. 2 at 53) of the first collar strap 52 attaches to the belt webbing 32. Similarly, a first end 55 of the second collar strap 56 is attached to a second section 48 of the headrest portion 24, which is laterally spaced from the first section 46, to transition between a second retracted or stored position (shown hidden in FIG. 2 at 56A), in which the second collar strap 56 is stowed substantially inside the headrest portion 24, and a second use or active position 56B, in which a second end 57 of the second collar strap 56 attaches to the belt webbing 32. The SIR 50 of the present invention is designed to lie comfortably around an occupant's neck, allow for full movement normally enjoyed with a conventional safety belt system, and retract to a stowed position that allows for undisturbed entry and egress of the vehicle 10.

The manner of operatively attaching the first and second collar straps 52, 56 to the headrest portion 24 to function as described above may be accomplished in a variety of manners. By way of example, the first end 51 of the first collar strap 52 is connected or attached to a first retractor (shown in phantom in FIG. 2 and identified by reference numeral 60), which is housed inside of the headrest portion 24. Similarly, the first end 55 of the second collar strap 56 is connected or attached to a second retractor (shown in phantom in FIG. 2 and identified by reference numeral 62), which is housed, for example, inside of the headrest portion 24 in spaced relation to the first retractor 60. The first and second retractors 60, 62 are respectively configured to selectively bias the first and second collar straps 52, 56 into the retracted positions 52A, 56A. The first and second retractors 60, 62 may be "No Locking Retractors" (NLR) or "Emergency Locking Retractors" (ELR).

With continuing reference to FIG. 2, the SIR 50 also includes a fluid dispensing apparatus, identified generally at 64, which is preferably housed inside of the headrest portion 24 of the vehicle seat assembly 16. The fluid dispensing apparatus 64 is operable to selectively simultaneously transition the first and second inflatable cushions 54, 58 from a non-expanded or deflated state (as seen in FIG. 1A) to an expanded or inflated state (as seen in FIG. 1B) when the first and second collar straps 52, 56 are in their respective use positions 52B, 56B. The fluid dispensing apparatus 64 includes a gas emitting inflator (shown hidden in FIG. 2 at 66) that is selectively actuable to emit inflation fluid, preferably a pressurized gas such as nitrogen, argon, or carbon dioxide. One or more fill tubes (shown hidden in FIG. 2 at 68) place the inflator 66 in fluid communication with the first and second inflatable cushions 54, 58 to port inflation gas from the inflator 66 to the cushions 54, 58. Even though the fluid dispensing apparatus 64 is depicted in FIG. 2 as employing a single inflator 66 that is housed inside the headrest portion 24, the fluid dispensing apparatus 64 may include numerous inflators (e.g., one for each collar strap 52, 56) that are housed, individually or collectively, at any location throughout the vehicle 10.

The SIR 50 also includes a controller 70, depicted in FIG. 1 in an exemplary embodiment as a micro-processor based electronic control unit (ECU), having a suitable amount of programmable memory 71. The controller 70 is connected in operative communication with the fluid dispensing device 64, and programmed, at least in part, to regulate the selective transition of the first and second inflatable cushions 54, 58 from the non-expanded state (FIG. 1A) to the expanded state (FIG. 1B).

A plurality of sensing mechanisms, represented herein by sensors/transducers S1-S2, are connected in signaling communication with the controller 70, and configured to continuously monitor, track, or detect various system parameters, as will be discussed in detail below. Correspondingly, the sensors S1-S2 are also configured to transmit signals to the controller 70 representative or indicative of the aforementioned parameters being monitored, tracked, or detected. For example, sensor S1, which may also be referred to as a "collar sensor", is configured to monitor if the first and second collar straps 52, 56 are in their respective use positions 52B, 56B (FIG. 2), and transmit signals indicative thereof to the controller 70. As an additional example, sensor S2 of FIG. 1, which may also be referred to as a "trigger sensor", is configured to monitor, track, or detect whether any of a variety of predetermined activation events has occurred, and to transmit signals indicative thereof to the controller 70. Such activation events may include, but are not limited to, a vehicle stop or impact generating a threshold G-Force (traditionally measured in "g's", defined as 9.80665 m/s2 or 32.174 ft/s2) on occupant 1.

According to preferred practice, the controller 70 is programmed and configured to disable the fluid dispensing device 64 in response to collar sensor signals indicating that the first and second collar straps 52, 56 are not both in their respective use positions 52B, 56B. Moreover, the controller is further programmed and configured to activate the fluid dispensing device 64 (i.e., command inflator 66 of FIG. 2 to dispense inflation gas to inflatable cushions 54, 58) in response to trigger sensor signals indicating any one of the predetermined activation events has occurred and collar sensor signals indicating that the first and second collar straps 52, 56 are both in their respective use positions 52B, 56B. Those skilled in the art will recognize and understand that the means of communication between the sensors S1-S2 and controller 70 is not restricted to the use of electric cables ("by wire"), but may be, for example, by radio frequency and other wireless technology, fiber optics, etc.

FIG. 3A of the drawings provides a schematic illustration of the first and second collar straps 52, 56 of FIG. 1, depicting each strap 52, 56 with a respective member of a clasping mechanism, indicated generally by reference numeral 72, attached at respective second ends 53, 57 thereof. More specifically, the clasping mechanism 72 of FIG. 3A includes a first clasp member 74 attached to the second end 53 of the first collar strap 52, and a second clasp member 76 attached to the second end 57 of the second collar strap 56. As will be described in extensive detail hereinbelow, the first clasp member 74 is configured to mate with the second clasp member 76 to thereby releasably lock the SIR 50—i.e., first and second collar straps 52, 56, to the belt webbing 32.

The first clasp member 74 may be attached to the first collar strap 52, for example, by a pivot pin 78, which extends through an aperture 80 (shown hidden in FIG. 3B) formed through an upper extent of the first clasp member 74, and a complimentary hole 82 formed in a first lip member 84 that extends from the second end 53 of the first collar strap 52. Likewise, the second clasp member 76 may be attached to the second collar strap 56, for example, by a pivot pin 78, which extends through an aperture 86 (shown hidden in FIG. 3B) formed through an upper extent of the second clasp member 76, and a complimentary hole 88 formed in a second lip member 90 that extends from the second end 57 of the second collar strap 56.

Looking at both FIGS. 3A and 3B, the first clasp member 74 has a generally rectangular main body 92 with a base or column 94 protruding generally perpendicularly from a center section thereof. A first, semi-circular button-head portion 96 with a cavity 98 defined therein is integrated with (e.g., formed or attached to) the base 94, spaced from the main body 92 of the first clasp member 74. Similarly, the second clasp member 76 includes a generally rectangular main body 100 with a base 102 protruding generally perpendicularly from a center section thereof. A second, semi-circular button-head portion 104 with an alignment tab 106 extending radially outward therefrom is integrated with (e.g., formed or attached to) the base 102, spaced from the main body 100 of the second clasp member 76.

The cavity 98 in the first button-head portion 96 is configured to receive and mate with the alignment tab 106 such that the first and second button-head portions 96, 104 align to cooperatively form a circular button head clasping pin (shown hidden in FIG. 3A and identified by reference numeral 112). Put another way, the first and second button-head portions 96, 104 each consist of opposing or mirrored halves of the button head clasping pin 112. When a vehicle occupant (e.g., occupant 1 of FIGS. 1A and 1B) grasps the first and second clasp members 74, 76 (e.g., at first and second pull-and-retraction stops 108 and 110, respectively) and presses them together, the alignment tab 106 inserts into cavity 98. In so doing, a first contact surface 97 of the first button-head portion 96 abuts against a second contact surface 105 of the second button-head portion 104, aligning the two semi-circular button-head portions 96, 104, which combine to form the circular button head clasping pin 112. It should be recognized that the button head clasping pin 112 may take on additional functional shapes (e.g., rectangular, elliptical, pentagonal, etc.) without departing from the intended scope of the present invention.

A receiving plate 114, as seen in FIGS. 4A-4C, is slidably supported on the belt webbing 32, and configured to mate with and attach to the clasping mechanism 72—i.e., first and second clasp members 74, 76. According to the embodiment of FIG. 4A, the receiving plate 114 has a receiving slot 116 defined through a front surface 115 thereof. The receiving slot 116 is configured (i.e., shaped and dimensioned) to receive the button head clasping pin 72.

The receiving plate 114 also includes a latching mechanism, defined herein by first and second operatively opposing latch arms 118 and 120, respectively, in FIG. 4B, which are connected to a rear surface 117 of the receiving plate 114. The latching mechanism is configured to selectively releasably lock the button head clasping pin 112 to the receiving plate 114, thereby retaining and securing the first and second collar straps in their respective use positions—i.e., attached to belt webbing 32, as depicted in FIG. 4C. Specifically, when the first and second button-head portions 96, 104 are placed in mating relation to form the button head clasping pin 112, and thereafter passed, pressed, and forced through receiving slot 116, first and second angled landing surfaces (shown as 122 and 124, respectively, in FIG. 3C) act to engage a respective inner peripheral edge 119 and 121, respectively, of the first and second latch arms 118, 120. In so doing, the first and second latch arms 118, 120 are forced outward, away from one another, to a disengaged position, shown hidden in FIG. 4B and respectively identified at 118B and 120B, until the first and second button-head portions 96, 104 pass through. At this point, one or more biasing members, such as first and second coil springs 126, 128, act to bias the first and second latch arms 118, 120 back towards one another, positioning the latch arms 118, 120 intermediate the button-head portions 96, 104 and the respective body 92, 100 to which they are attached.

Each latch arm 118, 120 is provided with a respective release button 130 and 132, which allow for one-handed release of the clasping mechanism 72 from the receiving plate 114. If an occupant wishes to release the SIR 50 from the belt webbing 32 (i.e., transition first and second collar straps 52, 26 to respective inactive and stowed positions 52A, 56A, FIG. 2), the release buttons 130, 132 are pressed towards one another, moving the latch arms 118, 120 to their respective disengaged positions 118B, 120B, allowing for release of the button head clasping pin 112 from the receiving plate 114.

While the best modes for carrying out the present invention have been described in detail herein, those familiar with the art to which this invention pertains will recognize various alternative designs and embodiments for practicing the invention within the scope of the appended claims.

The invention claimed is:

1. A supplemental inflatable restraint system for a vehicle having a passenger compartment with a seat assembly and a safety belt assembly mounted therein, the seat assembly having a headrest portion, and the safety belt assembly having a belt webbing, the supplemental inflatable restraint system comprising:

a first collar strap with a first inflatable cushion integrated thereto, a first end of said first collar strap configured to operatively attach to a first section of the headrest portion to transition between a first retracted position, in which said first collar strap is substantially inside the headrest portion, and a first use position, in which a second end of said first collar strap attaches to the belt webbing;

a second collar strap with a second inflatable cushion integrated thereto, a first end of said second collar strap configured to operatively attach to a second section of the headrest portion to transition between a second retracted position, in which said second collar strap is substantially inside the headrest portion, and a second use position, in which a second end of said second collar strap attaches to the belt webbing; and a fluid dispensing apparatus in fluid communication with said first and second inflatable cushions and operable to selectively transition said first and second inflatable cushions from a non-expanded state to an expanded state when said first and second collar straps are both in their respective said use positions.

2. The supplemental inflatable restraint system of claim 1, further comprising:

a controller in operative communication with said fluid dispensing device to regulate said selective transition of said first and second inflatable cushions from said non-expanded state to said expanded state;

a collar sensor in operative communication with said controller and configured to monitor whether said first and second collar straps are in their respective said use positions and transmit signals indicative thereof to said controller;

wherein said controller is programmed and configured to disable said fluid dispensing device in response to collar sensor signals indicating said first and second collar straps are not in their respective said use positions.

3. The supplemental inflatable restraint system of claim 2, further comprising:

a trigger sensor in operative communication with said controller and configured to monitor whether at least one predetermined activation event has occurred and transmit signals indicative thereof to said controller;

wherein said controller is further programmed and configured to activate said fluid dispensing device in response to trigger sensor signals indicating said at least one predetermined activation event has occurred and collar sensor signals indicating said first and second collar straps are in their respective said use positions.

4. The supplemental inflatable restraint system of claim 1, wherein said second end of said first collar strap and said second end of said second collar strap are operatively attached to the belt webbing by a clasping mechanism.

5. The supplemental inflatable restraint system of claim 4, wherein said clasping mechanism includes a first clasp member operatively attached to said second end of said first collar strap, and a second clasp member operatively attached to said second end of said second collar strap, wherein said first clasp member is configured to mate with said second clasp member to releasably lock to the belt webbing.

6. The supplemental inflatable restraint system of claim 5, wherein said clasping mechanism further includes a receiving plate operatively attached to the belt webbing and configured to mate with and attach to said first and second clasp members.

7. The supplemental inflatable restraint system of claim 6, wherein said first clasp member includes a first body with a first base protruding therefrom, and a first button-head portion with a cavity defined therein integrated with said first base; wherein said second clasp member includes a second body with a second base protruding therefrom, and a second button-head portion with an alignment tab extending therefrom integrated with said second base, said cavity configured to receive and mate with said alignment tab such that said first button-head portion aligns with said second button-head portion to form a button head clasping pin.

8. The supplemental inflatable restraint system of claim 7, wherein said receiving plate defines a receiving slot configured to receive said button head clasping pin.

9. The supplemental inflatable restraint system of claim 8, wherein said receiving plate includes a latching mechanism configured to selectively releasably lock said button head clasping pin to said receiving plate and thereby retain said first and second collar straps in their respective said use positions.

10. The supplemental inflatable restraint system of claim 9, wherein said receiving plate is slidably repositionable along the belt webbing.

11. The supplemental inflatable restraint system of claim 10, wherein said first end of said first collar strap operatively attaches to said first section of the headrest portion by a first retractor, and said first end of said second collar strap operatively attaches to said second section of the headrest portion by a second refractor, said first and second retractors respectively configured to selectively bias said first and second collar straps into their respective said retracted positions.

12. The supplemental inflatable restraint system of claim 11, wherein said fluid dispensing apparatus includes a gas emitting inflator configured to emit inflation gas, and at least one fill tube in fluid communication with said inflator and said first and second inflatable cushions to port inflation gas from said inflator to said first and second inflatable cushions.

13. A motorized vehicle having vehicle structure, comprising:

a seat assembly mounted to the vehicle structure and having a seat back portion with a headrest portion integrated at an upper end thereof;

a belt webbing attached to at least one of the vehicle structure and said at least one seat assembly;

a first collar strap with a first inflatable cushion integrated thereto, a first end of said first collar strap operatively attached to a first section of said headrest portion to transition between a first retracted position, in which said first collar strap is substantially inside said headrest portion, and a first use position, in which a second end of said first collar strap is attached to said belt webbing;

a second collar strap with a second inflatable cushion integrated thereto, a first end of said second collar strap operatively attached to a second section of said headrest portion to transition between a second refracted position, in which said second collar strap is substantially inside said headrest portion, and a second use position, in which a second end of said second collar strap is attached to said belt webbing; and at least one fluid dispensing apparatus in fluid communication with said first and second inflatable cushions and operable to selectively simultaneously transition said first and second inflatable cushions from a non-expanded state to an expanded state when said first and second collar straps are both in their respective said use positions.

14. The motorized vehicle of claim 13, further comprising:
a controller in operative communication with said at least one fluid dispensing device to regulate said selective transition of said first and second inflatable cushions from said non-expanded state to said expanded state;
a collar sensor in operative communication with said controller, and configured to monitor whether said first and second collar straps are in their respective said use positions and to transmit signals indicative thereof to the controller; and
a trigger sensor in operative communication with said controller and configured to monitor whether at least one predetermined activation event has occurred and to transmit signals indicative thereof to the controller;
wherein said controller is programmed and configured to disable said fluid dispensing device in response to collar sensor signals indicating said first and second collar straps are not in their respective said use positions; and
wherein said controller is further programmed and configured to activate said fluid dispensing device in response to trigger sensor signals indicating said at least one predetermined activation event has occurred and collar sensor signals indicating said first and second collar straps are in their respective said use positions.

15. The vehicle of claim 14, wherein said second end of said first collar strap and said second end of said second collar strap are operatively attached to said belt webbing by a clasping mechanism, said clasping mechanism including:
a first clasp member operatively attached to said second end of said first collar strap;
a second clasp member operatively attached to said second end of said second collar strap, wherein said first clasp member is configured to mate with said second clasp member; and
a receiving plate slidably repositionable along said belt webbing and configured to mate with and attach to said first and second clasp members.

16. The vehicle of claim 15, wherein said first clasp member includes a first body with a first base protruding therefrom, and a first button-head portion with a cavity defined therein integrated with said first base in spaced relation to said first body; wherein said second clasp member includes a second body with a second base protruding therefrom, and a second button-head portion with an alignment tab extending therefrom integrated with said second base in spaced relation to said second body, said cavity configured to receive and mate with said alignment tab such that said first button-head portion aligns with said second button-head portion to form a button head clasping pin.

17. The vehicle of claim 16, wherein said receiving plate defines a receiving slot configured to receive said button head clasping pin, and includes a latching mechanism configured to selectively releasably lock said button head clasping pin to said receiving plate and thereby secure said first and second collar straps in their respective said use positions.

18. The vehicle of claim 13, wherein said first end of said first collar strap operatively attaches to said first section of said headrest portion by a first retractor, and said first end of said second collar strap operatively attaches to said second section of said headrest portion by a second refractor, said first and second retractors being respectively configured to selectively bias said first and second collar straps into their respective said retracted positions 19. The vehicle of claim 13, wherein said at least one fluid dispensing apparatus includes a gas emitting inflator configured to emit inflation gas, and at least one fill tube in fluid communication with said inflator and said first and second inflatable cushions to port inflation gas from said inflator to said first and second inflatable cushions.

20. A head-and-neck restraint system for a motorized vehicle having a passenger compartment with at least one seat assembly and at least one safety belt assembly mounted therein, the at least one seat assembly having a headrest portion, and the at least one safety belt assembly having a belt webbing, comprising:
a first collar strap with a first inflatable cushion integrated thereto, a first end of said first collar strap configured to operatively attach to a first section of the headrest portion to transition between a first retracted position, in which said first collar strap is substantially inside the headrest portion, and a first use position, in which a second end of said first collar strap attaches to the belt webbing;
a second collar strap with a second inflatable cushion integrated thereto, a first end of said second collar strap configured to operatively attach to a second section of the headrest portion spaced from said first section to transition between a second retracted position, in which said second collar strap is substantially inside the headrest portion, and a second use position, in which a second end of said second collar strap attaches to the belt webbing;
at least one fluid dispensing apparatus in fluid communication with said first and second inflatable cushions and operable to selectively transition said first and second inflatable cushions from a non-expanded state to an expanded state;
a controller in operative communication with said at least one fluid dispensing device to regulate said selective transition of said first and second inflatable cushions from said non-expanded state to said expanded state;
a collar sensor in operative communication with said controller, and configured to monitor whether said first and second collar straps are in their respective said use positions and transmit signals indicative thereof to said controller; and
a trigger sensor in operative communication with said controller and configured to monitor whether at least one predetermined activation event has occurred and transmit signals indicative thereof to said controller;
wherein said controller is programmed and configured to disable said fluid dispensing device in response to collar sensor signals indicating said first and second collar straps are not in their respective said use positions; and
wherein said controller is further programmed and configured to activate said fluid dispensing device in response to trigger sensor signals indicating said at least one predetermined activation event has occurred and collar sensor signals indicating said first and second collar straps are both in their respective said use positions.

* * * * *